June 16, 1964  R. L. SMITH  3,137,329
RING BARKER WITH PNEUMATIC PRESSURE OPERATED DEBARKING ARMS
Filed Oct. 18, 1962  5 Sheets-Sheet 1

INVENTOR.
ROBERT L. SMITH
BY
ATTYS.

June 16, 1964  R. L. SMITH  3,137,329
RING BARKER WITH PNEUMATIC PRESSURE OPERATED DEBARKING ARMS
Filed Oct. 18, 1962  5 Sheets-Sheet 2

INVENTOR.
ROBERT L. SMITH
ATTYS.

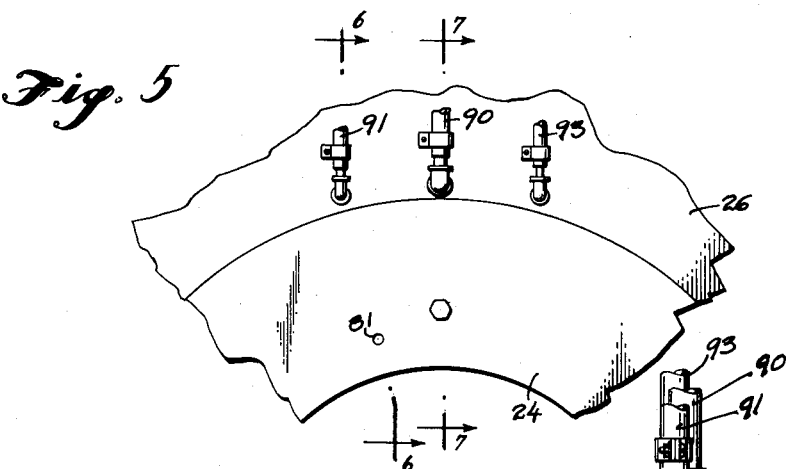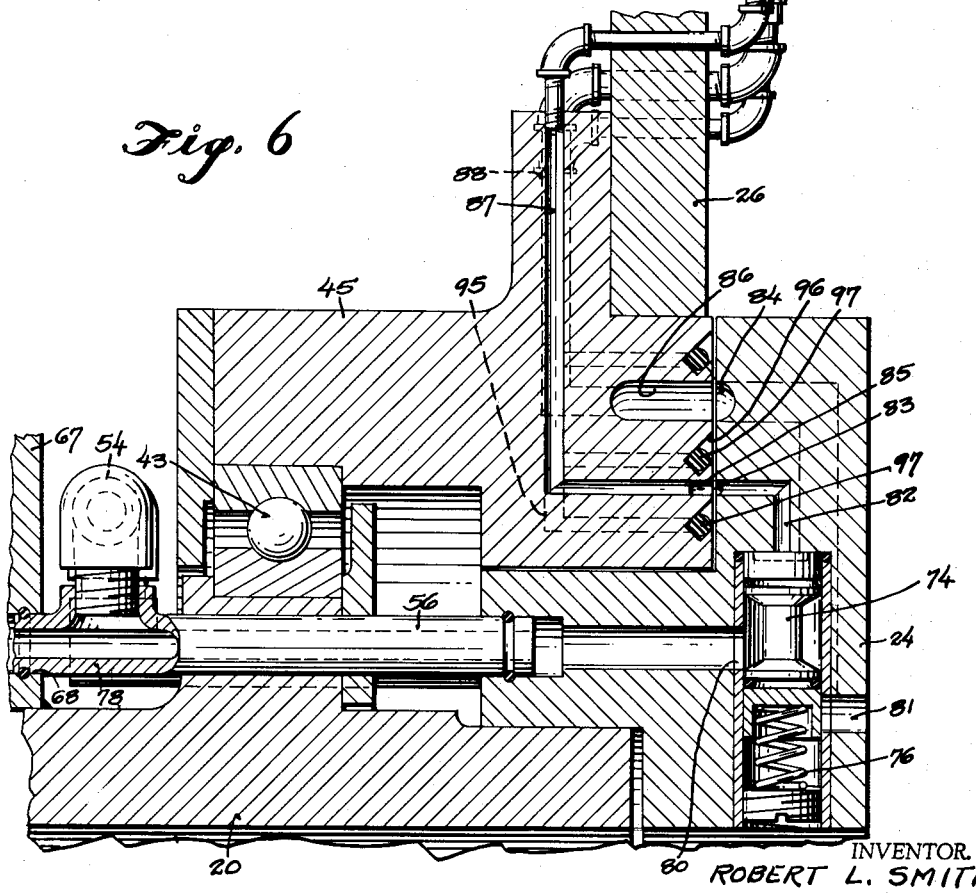

June 16, 1964 R. L. SMITH 3,137,329
RING BARKER WITH PNEUMATIC PRESSURE OPERATED DEBARKING ARMS
Filed Oct. 18, 1962 5 Sheets-Sheet 4

INVENTOR.
ROBERT L. SMITH
BY
ATTYS.

June 16, 1964  R. L. SMITH  3,137,329
RING BARKER WITH PNEUMATIC PRESSURE OPERATED DEBARKING ARMS
Filed Oct. 18, 1962   5 Sheets-Sheet 5

INVENTOR.
ROBERT L. SMITH
BY
Barnes & Reed
attys.

United States Patent Office 3,137,329
Patented June 16, 1964

3,137,329
RING BARKER WITH PNEUMATIC PRESSURE
OPERATED DEBARKING ARMS
Robert L. Smith, Seattle, Wash., assignor to Ederer
 Corporation, Seattle, Wash., a corporation of
 Washington
Filed Oct. 18, 1962, Ser. No. 231,458
21 Claims. (Cl. 144—208)

This invention relates to a log barker, and particularly a log barker of the type in which the log to be barked is fed axially through the center of a rotary ring structure and in course of said travel has the bark scraped from its periphery by action of debarking tools carried for rotation with the ring structure. The particular debarking tools employed in the present barker comprise scraper toes fixed to the free ends of a set of lever arms fulcrumd to the ring structure for swing motion toward and from the rotary axis of the latter about wrist axes paralleling said rotary axis and placed at equidistantly spaced intervals about the circumference of a circle having said rotary axis as its center.

For its principal object the invention aims to provide a new and improved ring barker in which pneumatic pressure is employed for forcefully contracting the lever arms in pressing the scraper toes against the surface of the log to be debarked.

As a further important object the invention aims to provide a ring barker in which the pneumatic pressure is applied to the lever arms through the medium of an annular hose or hoses disposed to occupy a position concentric with the rotary axis of the ring structure, and characterized, particularly, in that the said hose or hoses rotate with the ring structure.

A still further and important object of the invention is to devise a ring barker of the nature described having a perfected control system and one, particularly, which enables the lever arms to be instantly subjected to or relieved from said contracting pressure at the will of the operator.

The invention has the further and ancillary object of providing a ring barker in which the lever arms automatically move outwardly by centrifugal force upon being relieved of the contractive influence of the pneumatic pressure, thus precluding the scraper toes from digging into the wood of the log should the forward progress of the log be arrested while the same is being conveyed through the barker.

These and other objects and advantages of the invention will appear and be understood in the course of the following description and claims, the invention consisting in the novel construction and in the adaptation and combination of parts hereinafter described and claimed.

Figure 3:
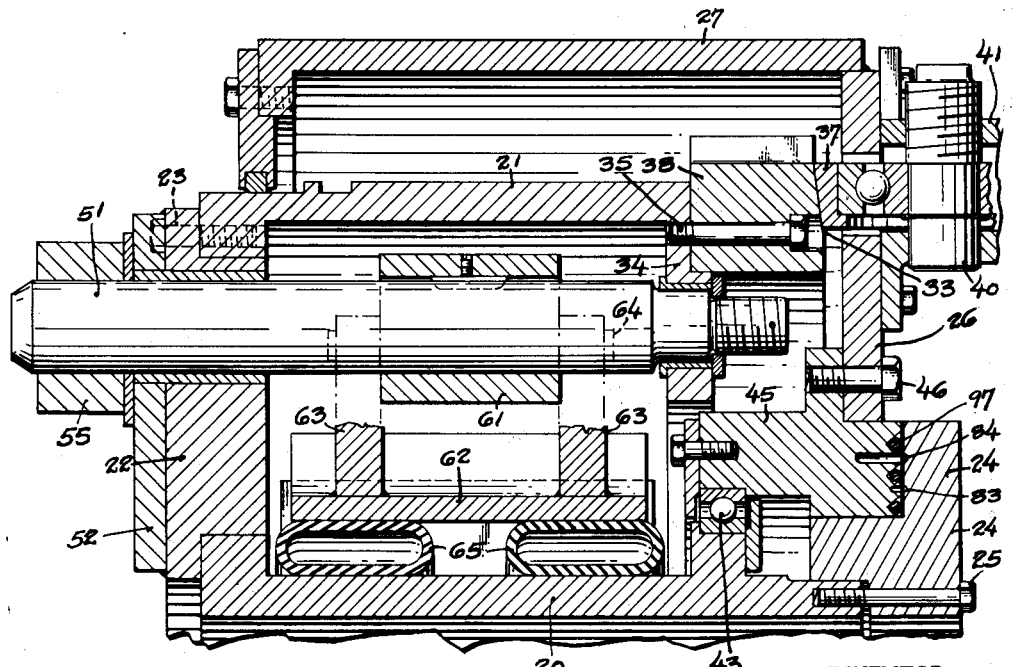
Figure 2:
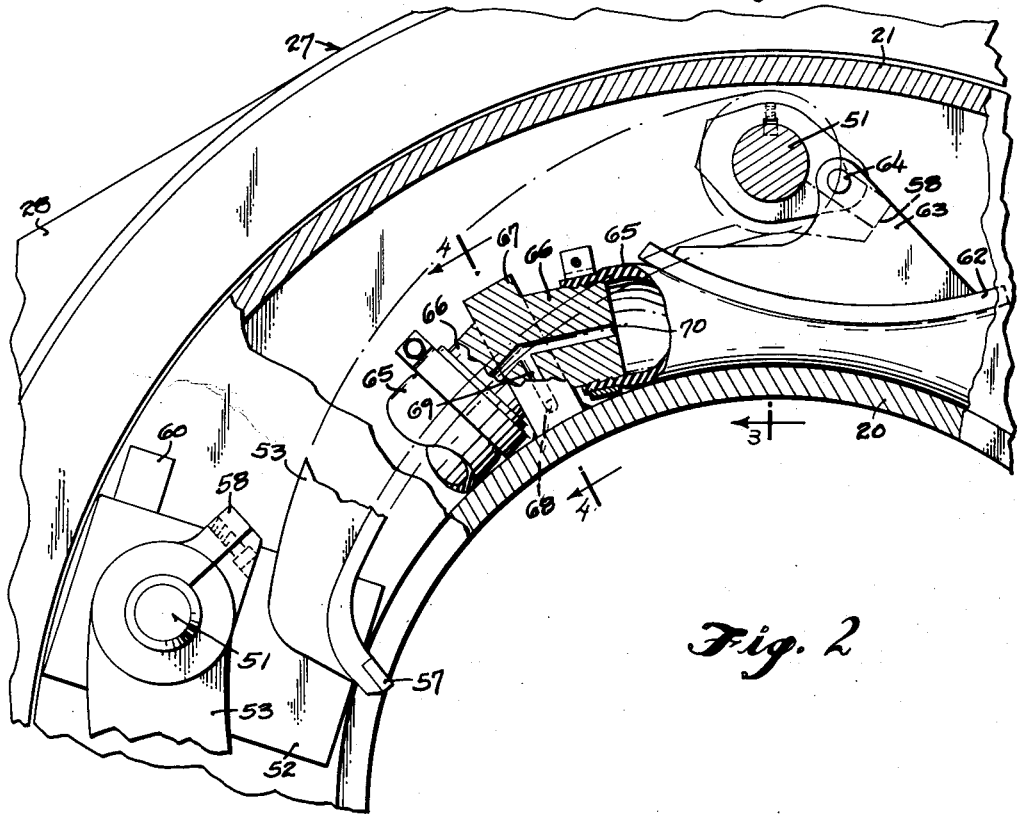
FIG. 2 is a fragmentary view thereof drawn to an enlarged scale and shown partly in elevation and partly in transverse vertical section with the section line indicated at 2—2 in FIG. 4.
Figure 4:
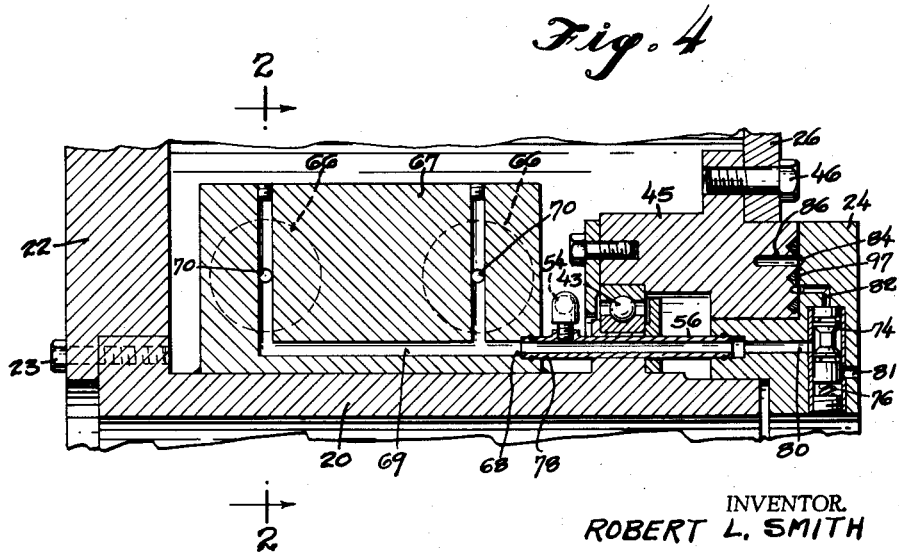

FIGS. 3 and 4 are fragmentary longitudinal vertical sectional views drawn on lines 3—3 and 4—4, respectively, of FIG. 2, with the scale enlarged from that of FIG. 2.

FIG. 5 is a fragmentary reduced scale elevational view of the machine taken from the end opposite that of FIG. 2.

Figure 7:
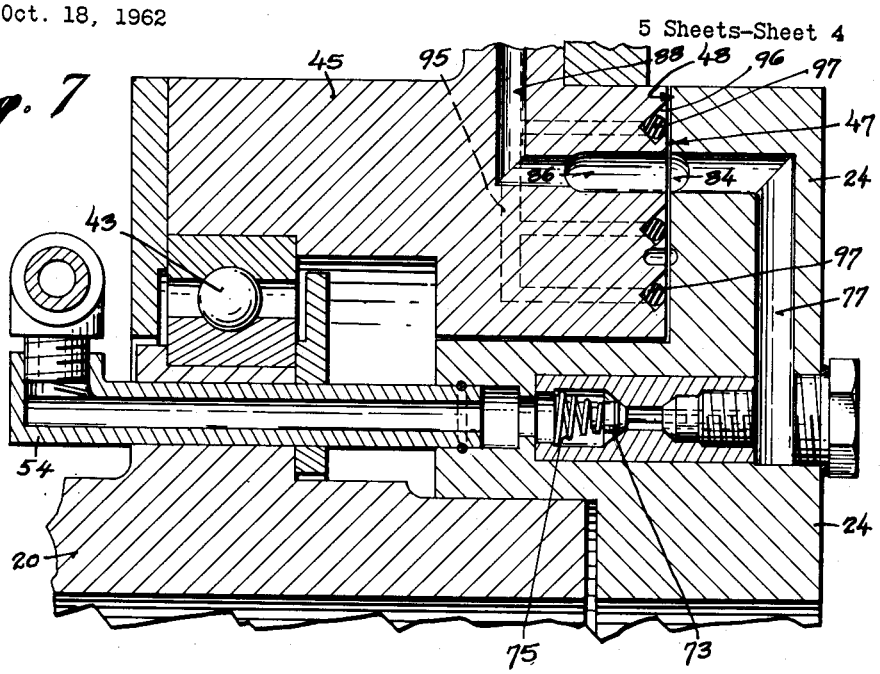

FIGS. 6 and 7 are fragmentary longitudinal vertical sectional views drawn to an enlarged scale on lines 6—6 and 7—7, respectively, of FIG. 5.

Figure 8:
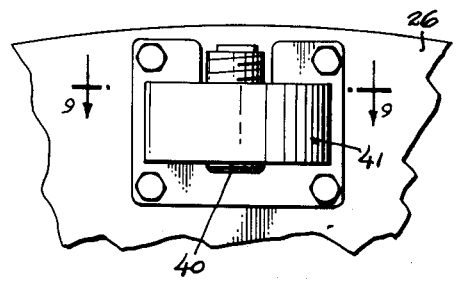

FIG. 8 is a fragmentary rear elevational view to illustrate one of a set of thrust bearings for the machine's rotating ring structure, employing the same scale as that of FIG. 3.

Figure 9:
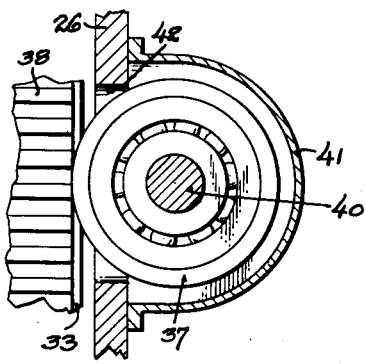

FIG. 9 is a fragmentary sectional view on line 9—9 of FIG. 8.

Figure 11:
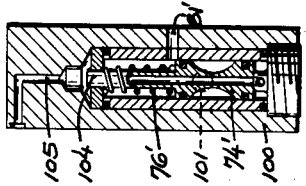
Figure 10:
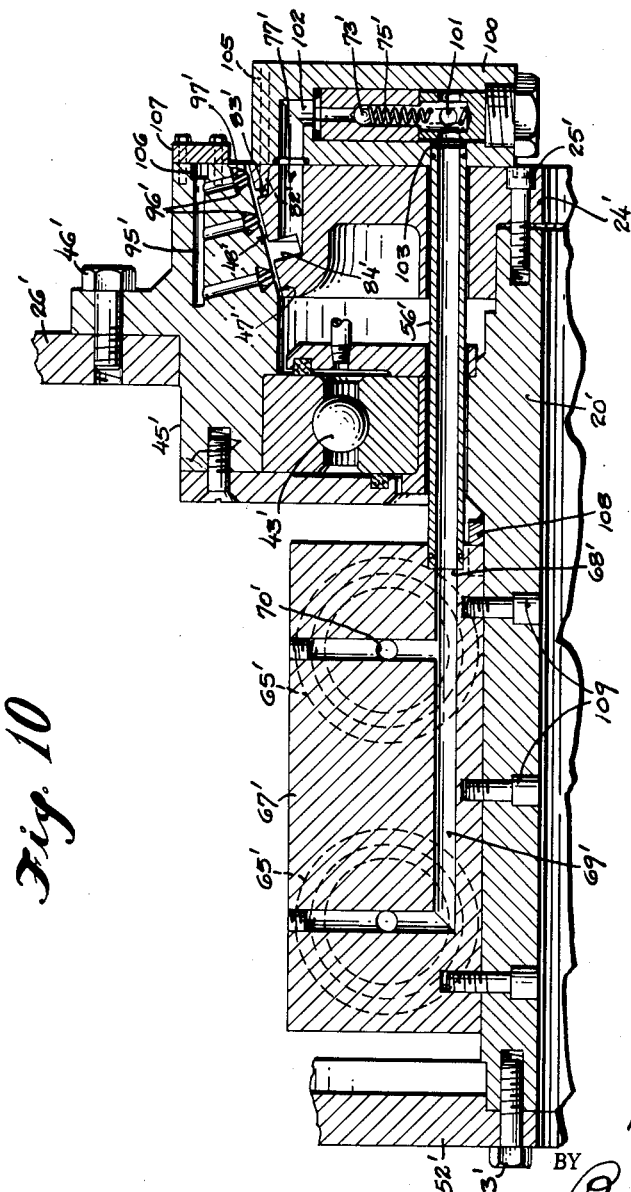

FIG. 10 is a fragmentary longitudinal vertical sectional view drawn on a section line similar to that of FIG. 4 to illustrate structure which is modified in several respects from the structure shown in the preceding views; and FIG. 11 is a detail longitudinal vertical sectional view of said modification drawn on a line shifted circumferentially in a moderate degree from the section line of FIG. 10.

Figure 1:
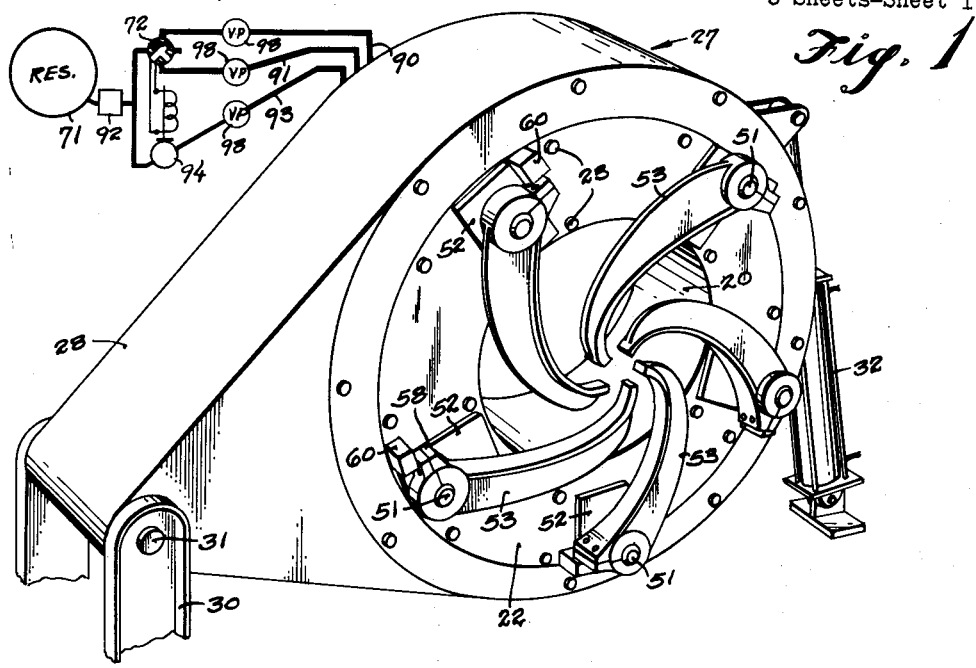
FIGURE 1 is a view partly in perspective and partly schematic illustrating a log barker constructed to embody preferred teachings of the present invention.

Referring to said drawings, the rotary ring structure of the present invention comprises inner and outer rings 20 and 21, respectively, disposed in spaced concentricity. One end of the space between said rings is closed by a front header 22 secured by cap screws 23 to inturned flanges of the rings. The other end of the space is closed in part by a rear header 24 secured by cap screws 25 to the inner ring 20 and in part by the facing wall 26 of a non-rotary annular housing. This housing surrounds the ring structure and provides rotary journals therefor. Designated generally by 27 the housing presents a leg 28 (see FIG. 1) which projects laterally from one side. The outer end of this leg is rooted to a stationary support 30 by means of a wrist pin 31. A hydraulic jack 32 acts as a complement to said wrist mounting in permitting the housing proper to be adjusted vertically in compensation of the different diameters of logs which are to be debarked. These logs, in their travel through the open center of the described rotary ring structure, ride over power-driven step-ribbed rollers. Neither these rollers nor associated hold-down wheels which press the logs against the rollers are illustrated in that the same are standard in the industry as a means of conveying logs through ring barkers.

The leg 28 is made hollow. While not shown there is housed in the hollow interior a spur gear which is driven by an electric motor. The spur gear drives the ring structure by meshing an annular ring gear 38. The ring gear is secured by bolts 35 to an inturned flange 34 of the outer ring 21, occupying a position adjacent to the housing's end wall 26 and having its facing flank bevelled, as at 33. The tapered rollers 37 of a set of four equidistantly spaced thrust bearings engage this bevelled surface. Pins 40 about which the rollers turn locate their axes radial to the rotary axis of the ring structure, and receive their support from a respective one of four boxes 41 which are boltably attached to the housing wall 26 in registration with openings 42 through which the rollers project. A journal bearing 43 for the ring structure is received at the rear end of the latter between the inner ring 20 and a surrounding ring-shaped retainer 45 secured by bolts 46 to the housing's end wall 26. For a purpose which will hereinafter appear, a planar surface 47 (FIG. 7) of the retainer 45 closely parallels a facing planar surface 48 presented by the rear header 24.

Rocker shafts 51 provide the fulcrums for the lever arms of the present debarker and are carried by the ring structure for rotation about axes paralleling the rotary axis of the ring structure. The front header 22, reinforced by a face plate 52, provides a journal for one end of each shaft, and the inturned flange 34 of the outer ring 21 provides a journal for the other end. A major length of each shaft is exposed to the hollow interior of the ring structure, and an extremity of each shaft projects beyond the front end of the ring structure.

The debarking lever arms 53 of the present invention have their hubs 55 securely clamped upon said projecting ends of the shafts. 57 denotes the scraper toes which are provided upon the free ends of said lever arms. Heel-forming lugs 58 extending from the lever hubs at the sides thereof opposite the lever arms act by engagement with stops 60 welded or otherwise secured to the face plates 52 to prescribe an inner limit of swing for the lever arms.

In the hollow interior of the ring structure each rocker shaft 51 has a crank arm 61 keyed thereto so as to occupy a position centered with respect to the length of the shaft, housed portion considered. A respective pressure shoe 62 lies radially inwardly from each crank arm, being carried by integral fork-arms 63 which straddle the free end of the crank arm and are pivoted thereto by a traversing wrist pin 64. A pair of pneumatic hoses 65 placed side by side and girding the inner ring 20 bear upon the inner faces of the several shoes. These hoses are of a wrap-around character and are localized upon the ring 20 by having their open ends clamped to nipples 66 which project from the opposite sides of a block 67.

The block has a port 68 in its front wall and serves the function of a manifold for supplying and discharging pressure air through said nipples to and from the girding hoses, and to such end is drilled, as at 69, to bring said port into communication with passageways 70 in the nipples. Two fluid-flow lines 54 and 56 connect by a common pipe 78 with said manifold port 68. One leads to the port from a source of pressure air supply 71 (FIG. 1) and is fitted with two valves, namely a control valve 72 and a check valve 73. The other dumps to atmosphere from the port and is fitted with a dump valve 74. The check valve 73 and the dump valve 74 are each housed in the rear header 24 and are each normally closed, the former by a spring 75 and the latter by a spring 76. Spring 75 works counter to the pressure of air fed from the source of supply through a passageway 77 to the admission side of the chest in which the valve is housed. The dump valve comprises a shuttle-mounted pressure-balanced spool working between a closed position isolating an admission port 80 from the emission port 81, and an open position bringing said ports into communication. The spring 76 works counter to the force of low-pressure air fed through a pilot passageway 82. Passageway 82 and passageway 77 each connect with a respective one of two circumferential grooves 83 and 84 formed concentric to the rotary axis of the ring structure in the planar face 48 of the header. Registering circumferential grooves 85 and 86 are formed in the planar face 47 of the retainer. Passageways 87 and 88 are drilled in the retainer to connect with the grooves 85 and 86, respectively, and connecting by nipples with the drill-holes are hoses 90 and 91 one to supply high-pressure air from the outlet side of the control valve 72 to the passageway 77, the other to supply air at reduced pressure to the passageway 82. Valve 72 is a 4-way valve controlling delivery of pressure air through said hose 91 to the passageway 82 as well as through hose 90 to the passageway 77. A third hose 93 leads from a solenoid valve 94 to a manifold passageway formed in the retainer, the solenoid valve being controlled by valve 72 so as to open and close automtically in concert with the opening and closing of valve 72, whether such valve 72 is bringing the supply source either into communication with the hose 90 or the hose 91. Each of the hose lines 90, 91 and 93 is fitted with a respective pressure regulating valve 98.

In the embodiment shown in FIGS. 3 through 7, inclusive, the manifold passageway is denoted by 95 and is drilled in the retainer proper. Branch lines lead from this passageway to a respective one of three circumferential grooves 96 formed in the planar face 47 of the retainer to occupy positions between and to the outside of the grooves 85 and 86. The grooves 96 are cut in the planar face and are conically developed, expanding toward the face. Each said groove 96 is fitted with a respective O-ring 97. Air supplied through hose 93 upon an opening of the solenoid valve 94 expresses the O-rings against the opposing planar face 48 to establish a seal. Upon a closing of such solenoid valve the pressure air is exhausted back through hose 93 to atmosphere and the O-rings responsively move by contraction inwardly to the closed ends of the grooves 96. This closing of the solenoid valve will perforce take place only in concert with an isolation, from the reservoir 71, of the hose 90 or the hose 91, depending upon which of the two had been in communication with the reservoir in consequence of the operation of valve 72. Any pressure air which had been supplied to the pneumatic hoses 65 is held therein by the check valve 73 so that there is of course no need to seal the registering grooves 84-86 against leakage excepting when pressure air is being supplied from the reservoir.

Between the reservoir 71 and the two valves 72 and 94 this is provided a lubricator 92 which introduces a minor volume of lubricant to the supplied air. This lubricates the O-rings and the several valves.

In the embodiment shown in FIGS. 10 and 11, primes of corresponding numbers designate parts which are functionally like or similar to those of the above-described embodiment. Paralleling planar faces 47' and 48' provided between a bearing retainer 45' and a rear header 24' are conically developed, and the header 24' is adjustable axially toward and from the inner ring 20', by means of the bolts 25', so that the spacing between said planar faces can be regulated at will.

The two chests in which valves 73' and 74' are housed are formed in a block 100 which is bolted to the outer face of the header 24', and a cross-over connection 101 is provided within this block between the two chests. The check valve 73' is a ball check closing by a spring 75' against the outlet end of a passageway 102 formed in the block and registering with a passageway 77' in the header leading from a circumferential groove 84' formed in the planar face 48'. A passageway (not shown) drilled in the retainer 45' connects hose 90 to a port formed in the planar face 47' in registration with said groove 84'. The outlet 103 from the chest in which said ball check is housed leads directly by a pipe 56' to the port 68' of the block 67' to which the pneumatic hoses 65' are attached.

The shuttle valve 74' has its spring 76' surrounding a head stem 104 of the valve, and such stem and the valve are center-bored so that pilot air is carried to the base of the valve from a passageway 105 formed in the block 100. Passageway 105 registers with a passageway 82' drilled in the header and leading from a circumferential groove 83' formed in the planar face 48'. A passageway (not shown) drilled in the retainer 45' connects hose 91 to a port formed in the planar face 47' in registration with the groove 83'.

Functioning counterparts 97' of the sealing O-rings 97 are fitted in circumferential grooves 96' cut in the planar face 47' in positions whereat the rings, when expressed by air pressure outwardly in said grooves, engage the planar face 48' at each of the opposite sides of the circumferential grooves 83' and 84'. The grooves 96' are sectionally of a dove-tail configuration requiring that the O-rings be squeezed in order to be expressed, and thus backing off automatically upon being freed of the expressing force of the pressure air. Such pressure air is carried to the grooves through passageways 95' fed from a circumferential groove 106 cut in an outer face of the retainer and closed by a cover ring 107 to which the hose 93 is attached by a suitable nipple (not shown). Plural sets of said passageways 95' lead inwardly from groove 106 at spaced intervals of the circumference.

Distinguished from the indicated weld-connection provided between the inner ring 20 and the manifold block 67, the block 67' and the pneumatic hoses 65' are arranged to be pre-assembled and slipped bodily, as a substantial tire or tires, onto the inner ring 20'. The inner end edge of the block lodges in a notched plate 108 which is welded in place upon the inner ring, and bolts 109 hold the block against displacement axially of the ring.

It is believed that the invention will have been clearly understood from the foregoing detailed description of my now-preferred illustrated embodiments of the invention. Air under pressure fed through supply hose 90 as the manual control valve 72 is opened passes the check valve 73 and inflates the pressure hoses 65, whereupon the shoes 62 are forced outwardly and act through the crank arms 61 to force the lever arms 53 inwardly. It is desirable that the debarking ends of the lever arms be of such a form that the leading end of a log being conveyed through the open center of the machine's rotating ring structure will, upon reaching the closed lever arms, cause the latter to open in the degree necessary for the log to enter and the debarking process be initiated. Forming the tool ends so as to accomplish this function is no part of the present invention, being common practice.

Should it be necessary, in course of debarking a log, to arrest the forward progress of the log, the operator, in order to preclude the debarking tools from gouging a groove in the arrested log, is enabled to expand the arms and responsively withdraw the tool ends from the log by supplying pressure air through the pilot connection to the pilot valve 74, whereupon the spool of the latter valve is shuttled by the pilot air pressure into a position whereat pressure air within the pressure hoses is dumped to atmosphere through port 81. Centrifugal force then causes the debarking levers to swing outwardly away from the log. An operation of the control valve 72 to supply pressure air through hose 90 again brings the debarking levers inwardly against the log when the latter is free to continue its forward progress through the debarking station.

Changes in the details of construction will suggest themselves and may be resorted to without departing from the spirit of the invention. It is my intention that no limitations be implied and that the hereto annexed claims be given the broadest interpretation to which the employed language fairly admits.

What I claim is:

1. A log barker comprising a log-supporting means, a ring surrounding the supported log, a log-barking member, means provided by the ring supporting said log-barking member for movement thereof toward and from the supported log in a direction which is generally radial thereto, means for effecting relative movement between said barking member and the supported log in a direction both circumferentially and longitudinally of the log, pneumatic pressure operated means for yieldingly urging the barking member toward the log, a source of air under pressure for said pressure operated means, and means subject to control of an operator for either supplying pressure air from said source to the pressure operated means or dumping pressure air from the pressure operated means, said pneumatic means comprising an annular inflatable tube disposed concentric to the center of the ring structure and carried by the latter in a position localized with respect to the ring structure.

2. A log barker comprising ring structure arranged to receive a log therethrough, a plurality of lever arms having bark-scraping means on their free ends and fulcrumed to the ring structure at spaced intervals of the circumference for movement of said free ends toward and from the center of the ring structure in a direction generally radial thereto, an annular tube inflatable by pneumatic pressure and carried by the ring structure, a source of pneumatic pressure therefor, and operative connections between said inflatable tube and the lever arms acting by inflation of the tube to yieldingly urge the free ends of the arms inwardly.

3. Structure according to claim 2, the connections last recited comprising a respective crank arm for each lever arm fixedly associated with the lever arm.

4. A log barker comprising a ring structure journaled for rotation and arranged to receive a log therethrough, power means for rotating the ring structure, a plurality of log-barking members located at spaced intervals of the circumference of the ring structure and carried thereby for movement inwardly toward and outwardly from the center of rotation, an annular tube inflatable by pneumatic pressure and carried by the ring structure, a source of pneumatic pressure therefor, operative connections between said inflatable means and the log-barking members acting by inflation of the inflatable means to yieldingly press the log-barking members inwardly, means controlled from a point remote to the ring structure for either supplying pressure air from the source to the inflatable means or dumping pressure air from the inflatable means, the air dumped being delivered to atmosphere through a normally closed valved port formed in the ring structure.

5. The log barker of claim 4 in which the valve for said dump port is opened by air under pilot pressure supplied from the source.

6. A log barker comprising a mounting member, a ring journaled for rotation from the mounting member and arranged to receive a log therethrough, power means for rotating the ring, a plurality of log-barking members located at spaced intervals of the circumference of the ring and carried thereby for movement inwardly toward and outwardly from the center of rotation, an annular inflatable tube carried by the ring, a source of pneumatic pressure therefor, controlled means for supplying pressure air to and dumping pressure air from the tube, and operative connections between said inflatable tube and the barking members acting by inflation of the tube to yieldingly force the barking members inwardly.

7. The log barker of claim 6 in which pressure air for the inflation of said tube is fed from the source to the tube through passageways formed in the mounting member and in the ring registering by annular grooves disposed concentric with the ring's axis of rotation and formed in at least one of two closely spaced facing surfaces presented one by said ring and the other by said mounting member, one of said facing surfaces having an annular groove at each of the opposite sides of its said registering groove each fitted with a respective O-ring.

8. Structure according to claim 7, and means for delivering, behind the O-rings, from the source to each of the grooves in which said O-rings are fitted, a supply of pressure air so as to express the O-rings outwardly in their respective groove, means being provided causing said expressing air to be delivered automatically in concert with a delivery of pressure air to said registering groove.

9. Structure according to claim 7, and means for supplying a lubricant to the pressure air fed from said source.

10. The log barker of claim 6 in which pressure air for the inflation of said tube is fed from the source to the tube through passageways formed in the mounting member and in the ring and registering by an annular groove disposed concentric with the ring's axis of rotation and formed in one of two closely adjacent facing surfaces presented by said ring and by the mounting member, the pressure air in feeding through said passageways of the ring to the inflatable tube traversing a check valve which opens in the direction of said feed.

11. A log barker comprising a mounting member, ring structure journaled for rotation from the mounting member and arranged to receive a log therethrough, power means for rotating the ring structure, a plurality of lever arms having bark-scraping means on their free ends and fulcrumed from the ring structure at spaced intervals of the circumference for movement of said free ends toward and from the rotary center of the ring structure in a direction generally radial thereto, a respective crank arm for each lever arm fixedly associated therewith, an inflatable annular tube carried by the ring structure, operative connection from the tube to the crank arms acting by inflation of the tube to swing the crank arms in a direction responsively causing the free ends of the lever arms to move inwardly, a source of pressure air, and means controlled from a point remote to the ring structure for supplying air under pressure from said source to the tube or exhausting pressure air from the tube to atmosphere, the fulcrums for the lever arms comprising pins journaled for rocker motion adjacent each of their two ends, the respective lever arms being fixed to an end of said pins projecting beyond the related journal, the respective crank arms being fixed to a center portion of said pins lying between the two journals.

12. A log barker according to claim 11 in which both the pressure air which is supplied to the tube and the pressure air exhausted from the tube traverse a respective valve carried by the ring structure, said valve for the supply line being a check valve opening with the supplied air, said valve for the exhaust line being a normally closed valve opened by delivery of air under pilot pressure through a pilot line which also leads from the pressure source of supply.

13. A log barker according to claim 12 characterized in that the main supply of pressure air and the pilot supply of pressure air are each delivered to the ring structure through a respective annular groove formed concentric to the axis of rotation of the ring structure in one of two closely spaced paralleling faces of two members one of which is stationary and the other of which rotates with the ring structure, the stationary face having annular sealing grooves cut therein at each of the opposite sides of said air-supply grooves, a respective O-ring fitting each of said sealing grooves, and means for supplying pressure air into said sealing grooves behind the O-rings so as to express the O-rings against the opposite face of said rotating member automatically in concert with the delivery of pressure air through either of said air-supply grooves, the sealing grooves being formed so that the O-rings contract into the grooves in the absence of air pressure behind the O-rings.

14. A log barker according to claim 12 characterized in that the main supply of pressure air and the pilot supply of pressure air are each delivered to the ring structure through a respective annular groove formed concentric to the axis of rotation of the ring structure in one of two closely spaced paralleling faces of two members one of which is stationary and the other of which rotates with the ring structure, the stationary face having annular sealing grooves cut therein at each of the opposite sides of said air-supply grooves, a respective O-ring fitting each of said sealing grooves, means for supplying pressure air into said sealing grooves behind the O-rings so as to express the O-rings against the opposite face of said rotating member automatically in concert with the delivery of pressure air through either of said air-supply grooves, paralleling faces of said two members being conically developed relative to the axis of rotation of the ring structures with the stationary face disposed to the outside, the sealing grooves, sectionally considered, narrowing toward the open end thereof so that the O-rings retract into the grooves in the absence of air pressure behind the O-rings.

15. A log barker according to claim 11 in which the annular tube is a wrap-around tube, the ring structure having a block secured thereto and presenting oppositely directed nipples to which the two ends of the tube are clamped, passageways being provided in the block and the nipples for delivering the pressure air to and discharging same from the tube.

16. The log barker of claim 15 in which means are provided permitting the block and the inflatable tube to be pre-assembled and slipped bodily onto the exterior surface of the inner of two paralleling spaced rings comprising the ring structure.

17. A log barker according to claim 11, two of said tubes being provided seating against the ring structure in side-by-side relation, the operative connection from the tube to the crank arms comprising, for each crank arm, a respective single shoe bearing upon the faces of the two hoses opposite the seating faces and attached by a wrist pin to the free end of the crank arm.

18. A log barker according to claim 11, the rotary journal for the ring structure comprising an annular bearing, and a plurality of circumferentially spaced thrust bearings each comprising a race bearing against a side face of the ring structure and carried by the mounting member for rotation about an axis radial to the rotary axis of the ring structure.

19. The log barker of claim 11 in which pressure air for the inflation of said tube is fed from the source to the tube through passageways formed in the mounting member and in the ring and connecting by registering annular grooves disposed concentric with the ring's axis of rotation and formed in closely adjacent facing surfaces presented one by said ring and the other by the mounting member, said facing surfaces being disposed approximately normal to said rotary axis, said facing surface of the mounting member being provided at each of the opposite sides of the related one of said air-supply grooves with a conically developed groove placed concentric with the air-supply groove and expanding toward the face, each of said conically developed grooves being fitted with a respective O-ring, means being provided for delivering, behind each of the O-rings, a supply of pressure air acting counter to the normal contractive tendency of the O-rings and causing the O-rings to expand and move outwardly within their grooves into sealing engagement with said opposing face of the ring.

20. A sealing system for use in conjunction with a rotating member and a stationary member presenting closely spaced paralleling faces disposed concentric to the axis of rotation of the rotating member and characterized in that the rotating member carries a working element activated by pressure air supplied from a stationary source of supply through passageways formed in the stationary member and in the rotating member and registering by a circumferential groove formed in one of said faces, said pressure air delivered to the working element traversing a check valve carried by the rotating element and opening with the delivered air, valve means associated with the source of pressure air supply for connecting said air-supply groove with or isolating the same from the source, said face of the stationary member presenting circumferential sealing grooves located at each of the opposite sides of said air-supply groove, a respective O-ring fitted in each of said sealing grooves, a valved connection between a source of pressure air supply and each of said sealing grooves acting, when open, to supply pressure air behind the O-rings and responsively express the same outwardly within said grooves into sealing engagement with the opposing face of the movable member, and means for opening and closing, respectively, the last-named valve automatically in response to the connection of the air-supply groove with, and isolation of said air-supply groove from the air source.

21. A log barker comprising a mounting member, a ring structure journaled for rotation from the mounting member and arranged to receive a log therethrough, power means for rotating the ring structure, a plurality of log-barking members located at spaced intervals of the circumference of the ring structure and carried thereby for movement inwardly toward and outwardly from the center of rotation, an inflatable tube having its two ends open, a block connected to the ring structure and formed to present oppositely directed nipples to which said open ends of the tube are joined in a manner such that the tube and block collectively produce a substantial tire which is adapted to be located concentric to the rotary axis of the ring structure, a tube-inflating source of pneumatic pressure, pressure air supplied from said source being fed through said block and the nipples to the interior of the inflatable tube, and operative connection between said tire and the barking members acting by inflation of the tube to yieldingly force the barking members inwardly, means being provided permitting the block and tube to be pre-assembled and slipped bodily in a direction endwise to said rotary axis into functioning position relative to said barking members, said connection between the block and the ring structure holding the block against displacement either in an axial or circumferential direction relative to the ring structure.

References Cited in the file of this patent

UNITED STATES PATENTS

| | | |
|---|---|---|
| 2,888,966 | Morgan | June 2, 1959 |
| 2,908,302 | Mullis | Oct. 13, 1959 |
| 2,945,706 | Franked | July 19, 1960 |
| 3,053,294 | Andersson | Sept. 11, 1962 |